E. E. WILLIAMS.
MACHINE FOR MAKING AND DRIVING FASTENERS.
APPLICATION FILED MAR. 21, 1906.

1,121,058.

Patented Dec. 15, 1914.

WITNESSES:
Gustave Dieterich
Edwin K. Dieterich

INVENTOR
Elmer E. Williams
BY
Conrad Augustus Dieterich
his ATTORNEY

E. E. WILLIAMS.
MACHINE FOR MAKING AND DRIVING FASTENERS.
APPLICATION FILED MAR. 21, 1906.

1,121,058.

Patented Dec. 15, 1914.
7 SHEETS—SHEET 2.

Fig. 2.

WITNESSES:
Gustave Dieterich
Edwin H. Dietrich

INVENTOR
Elmer E. Williams
BY
Conrad Augustus Dietrich
his ATTORNEY

E. E. WILLIAMS.
MACHINE FOR MAKING AND DRIVING FASTENERS.
APPLICATION FILED MAR. 21, 1906.

1,121,058.

Patented Dec. 15, 1914.
7 SHEETS—SHEET 6.

WITNESSES:
Gustave Dieterich
Edwin H. Dietrich

INVENTOR
Elmer E. Williams
BY
Conrad Augustus Dieterich
his ATTORNEY

E. E. WILLIAMS.
MACHINE FOR MAKING AND DRIVING FASTENERS.
APPLICATION FILED MAR. 21, 1906.

1,121,058.

Patented Dec. 15, 1914.
7 SHEETS—SHEET 7.

WITNESSES:
Gustav Dieterich
Edwin H. Dieterich

INVENTOR
Elmer E. Williams
BY
Conrad Augustus Dieterich
his ATTORNEY

UNITED STATES PATENT OFFICE.

ELMER E. WILLIAMS, OF NEW YORK, N. Y., ASSIGNOR TO EMMA DOIG, EXECUTRIX, OF NEW YORK, N. Y.

MACHINE FOR MAKING AND DRIVING FASTENERS.

1,121,058.   Specification of Letters Patent.   Patented Dec. 15, 1914.

Application filed March 21, 1906. Serial No. 307,170.

*To all whom it may concern:*

Be it known that I, ELMER E. WILLIAMS, a citizen of the United States, residing at the city of New York, borough of Brooklyn, Kings county, in the State of New York, have invented certain new and useful Improvements in Machines for Making and Driving Fasteners, of which the following is a full, clear, and exact specification.
My invention relates to improvements in machinery for securing together or uniting strips of wood or analogous material, and the same has for its object more particularly to provide a simple, efficient and reliable machine for making the ends of boxes and similar structures.

Further said invention has for its object to provide a machine in which the material of which the fastening devices are made is automatically fed into the machine in the form of a strip or band; the end of said strip or band severed therefrom in sections of predetermined and appropriate length, and the severed sections then driven into the opposing or adjoining edges of the wooden strips or material to be united.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts.

In said drawings 15 designates a frame comprising a base 16, upon the upper surface of which near its opposite ends are bolted vertical supports 17, 17 secured together at their upper ends by a transverse bar or stay 18, and 19, 19 denote longitudinal slots or recesses provided in said vertical supports 17 17.

20 denotes a horizontal plate or table which is secured above the base 16 to the vertical supports 17 17. Below said plate or table 20 is supported in bearings provided in the supports 18, 18, a main driving shaft 21 having fixed thereon a pulley 22, and a clutch 23 adapted to be shifted into engagement with coöperating parts arranged upon said pulley by means of a treadle 24 and intermediate mechanism 25. Upon the outer ends of said driving shaft 21 are fixed small gear wheels 26, 26 which mesh with the larger gear wheels 27, 27 fixed upon the ends of a shaft 28 which is mounted in front of the main driving shaft 21 in suitable bearings in the supports 17, 17.

Arranged and working within the supports 17 17 is a vertically-movable crosshead 29 provided at its ends with oppositely projecting flanges 30, 30 which serve to guide the ends of said cross-head 29 upon the supports 17 17 and near the center of said cross-head are provided oppositely projecting members or arms 31, 31 which are disposed at right angles to the crosshead 29 and provided along their lower edges with longitudinal recesses 32, 32.

33, 33 denote rods which are pivotally secured at their upper ends to the projecting ends of the cross-head 29 and at their lower ends to the gear wheels 27 27 on the shaft 28.

A short distance above the plate or table 20, and directly below the cross-head 29 is arranged a transverse support 34 which is rigidly secured at its ends to the support 17 17 by screws or bolts 35 35. Near the center of said transverse support 34 are provided outwardly projecting members or arms 36 36, which are arranged substantially in alinement with the arms 31 31 on the cross-head 29, and provided on their upper surfaces with longitudinal recesses 37, 37. To the opposite ends of the plate or table 20 are secured brackets 38, 38, upon the outer ends of which are mounted reels 39, 39 each of which is adapted to receive a roll of metal strip or tape 40 preferably sharpened along its lower edge, and corrugated transversely.

Partly upon the cross-head 29, and partly upon the transverse support 34 are arranged the mechanisms for feeding the corrugated bands into the machine; severing the ends thereof, which constitute the fastening devices, and then driving the same into the abutting edges of the boards or other material to be united.

In the accompanying drawings I have shown a machine incorporating only two mechanisms, but it will be obvious that the invention is not limited to that number, as the number of such mechanisms may be increased or diminished at will within certain limitations, and as the said mechanisms are exact duplicates of each other a detailed description of one will cover the other. Each of said mechanisms comprises a chuck or casing 41 having a cover plate 42 provided at one side with a projecting arm 43. At the back of said casing 41 near its center is a rearwardly projecting lug 44 adapted to rest upon the upper surface of the arm 36 on the transverse support 34 and provided with an aperture through which extends a bolt 45 having its head 46 disposed within the longitudinal recess 37 in said arm 36, and provided upon its upper threaded end with a wing-nut 47 by means of which said casing 41 may be secured to its adjusted position upon the arm 36. The casing 41 is provided at its center with a rectangular vertical recess 48 within which works a plunger 49 secured at its upper end to a block 50 adjustable in the recess 32 of the arm 31 and adapted to be maintained within said recess 32 to its adjusted position by a longitudinal plate 51 and screw 51ˣ. The plunger 49 is provided with a reduced lower end 52, and to each side of said plunger 49 within the casing 41 are provided jaws 53, 53 which are pivotally supported at their upper ends upon screws 54, 54, and their lower ends provided with inwardly projecting portions 55 which portions when in contact with each other produce a free portion intermediate said jaws adapted to receive the end of the corrugated metal strip 40. The lower ends of said jaws 53 53 are held spring pressed against each other by coil springs 56, 56 arranged in chambers 57 57 at the lower end of the casing 41, and adapted to be adjusted by screws 58, 58 arranged in the outer ends of said chambers.

At the lower left-hand side of the casing 41 is a shearing plate 59 which is secured thereto by screws 60 60 passing through slots 61, 61 and adapted for horizontal adjustment by means of a screw 62 extending into said casing and contacting with the rear edge of said plate 59. The inner edge of said plate 59 is arranged substantially on a line with the inner edge of the left-hand jaw 53. In the right-hand lower side of the casing 41 is a horizontal recess 63 within which works a reciprocating knife 64 having an inner scarfed end adapted to coöperate with the front edge of the plate 59 to sever the ends of the metal strip 40. The reciprocation of said knife 64 is effected through the medium of a bell-crank lever 64ᵃ which is pivotally secured to the arm 43 of the chuck or casing cover 42, and has the end of its vertical member pivotally secured to the projecting portion of the knife 64, and the end of its horizontal member pivotally secured to the lower end of a rod 65 which has its upper portion loosely disposed within the adjustable block 50 on the arm 31, which block also carries the plunger 49.

65ᵃ, 65ᵃ denote stops adjustably secured upon the rod 65 above and below the projecting portion of the block 50, in order to permit the cross-head 29 and arm 31 to move up and down to a certain extent without actuating said rod 65.

At the lower edge of the casing 41 is secured a laterally projecting plate 66. Near the front edge of said plate 66 are arranged two feed rollers 67, 68. The roller 67 is smooth and is supported on a sliding bearing 69 which is yieldingly maintained on said plate 66 by means of a spring 70 arranged in a chamber in the under side of said plate 66 which bears at one end against said bearing 69, and at its other end against an adjusting screw 71. The roller 68 is corrugated and provided with a bevel gear 72 which jointly revolve upon a short shaft or stud 73 secured upon the plate 66, and at the side of said corrugated roller is secured a bifurcated bearing 74 in which is supported a shaft 75 having fixed at its inner end a bevel gear wheel 76 meshing with the bevel gear wheel 72 on the roller 68.

77 denotes a ratchet wheel which is fixed upon the shaft 75, and beside said ratchet wheel 77 is loosely mounted at its inner end an arm 78 which is provided near its outer end with a spring pressed detent 79 adapted to engage the ratchet wheel 77.

80 denotes a rod which is pivotally secured at its lower end to the arm 78 and has its upper portion loosely disposed within the adjustable block 81 working in the recess 32 of the arm 31.

82 82 denote stops adjustably secured upon the rod 80 above and below the block 81, so as to allow the cross-head 29, and arm 31 a limited movement in both directions without actuating the rod 80. The block 81 is adapted for securement to its adjusted position upon the arm 31 by the plate 51 and screws 51ˣ.

Upon the inner edge of the plate 66 adjacent to the feed roller 67 is secured a bearing 83 in which is supported a rod 84 having a head 85 at its inner end held against the metal strip 40 as it passes into the casing 41, by a spring 86 disposed upon said rod intermediate its bearing and the head 85, and at the outer end of said rod is a pin 87 which serves to limit the inward movement of said rod 84.

Upon the front plate 42 of the chuck or casing 41 directly above the point where the metal strip 40 enters the same is secured an adjustable bearing 88 in which is mounted a guide roller 89 adapted to contact with the upper edge of the strip 40 and guide the same properly into the chuck or casing 41.

Figure 1:
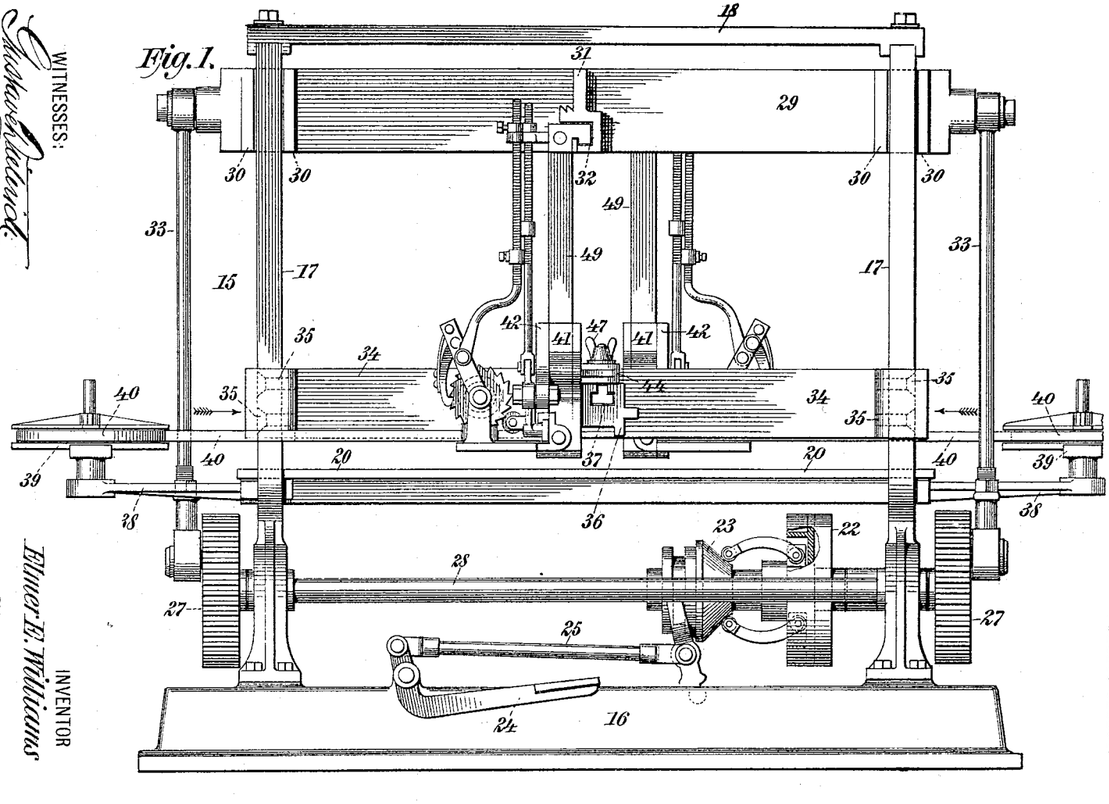
Figure 1 is a front view showing a machine made according to and embodying my invention.
Figure 2:
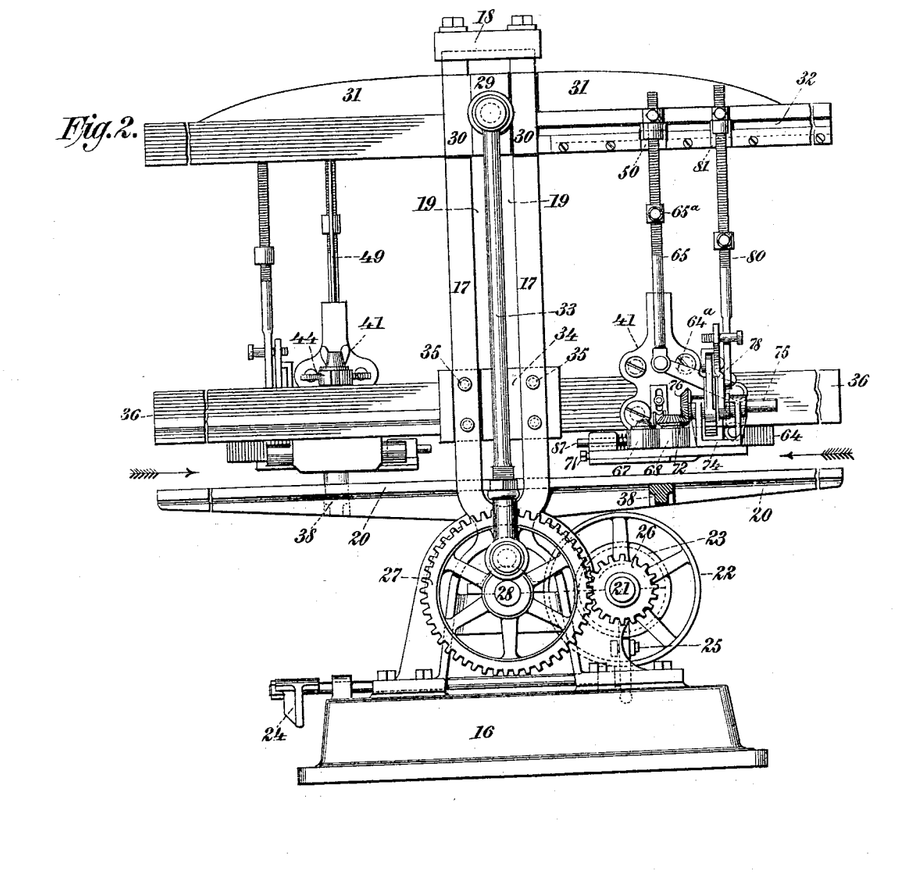
Fig. 2 is an end view.
Figure 3:
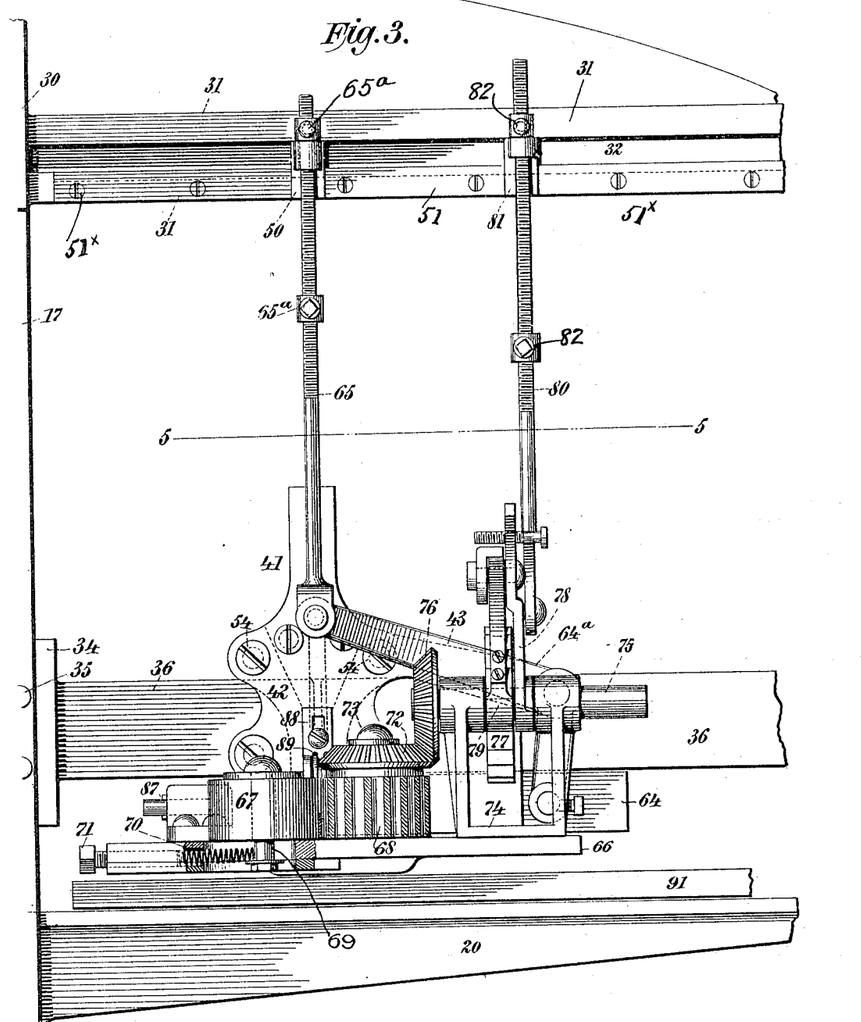
Fig. 3 is an enlarged detail side view of the feeding and driving mechanism, seen at Fig. 2.
Figure 4:
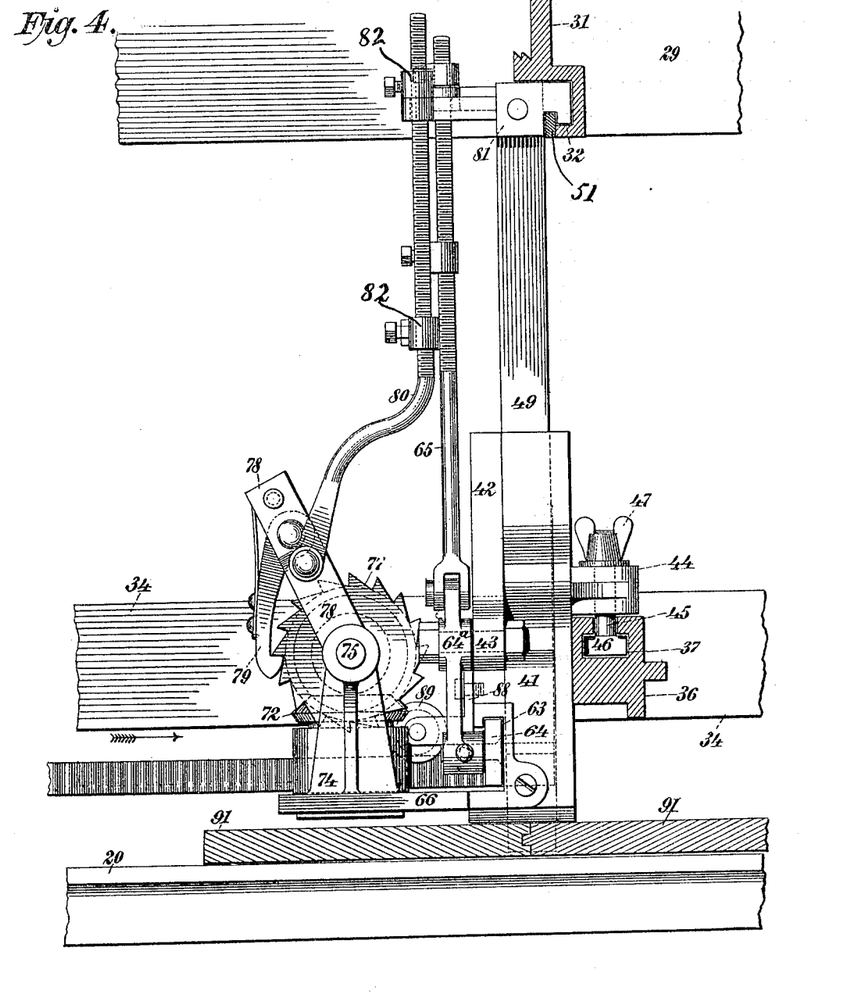
Fig. 4 is an enlarged detail front view, partly in section, of said feeding and driving mechanism.
Figure 5:
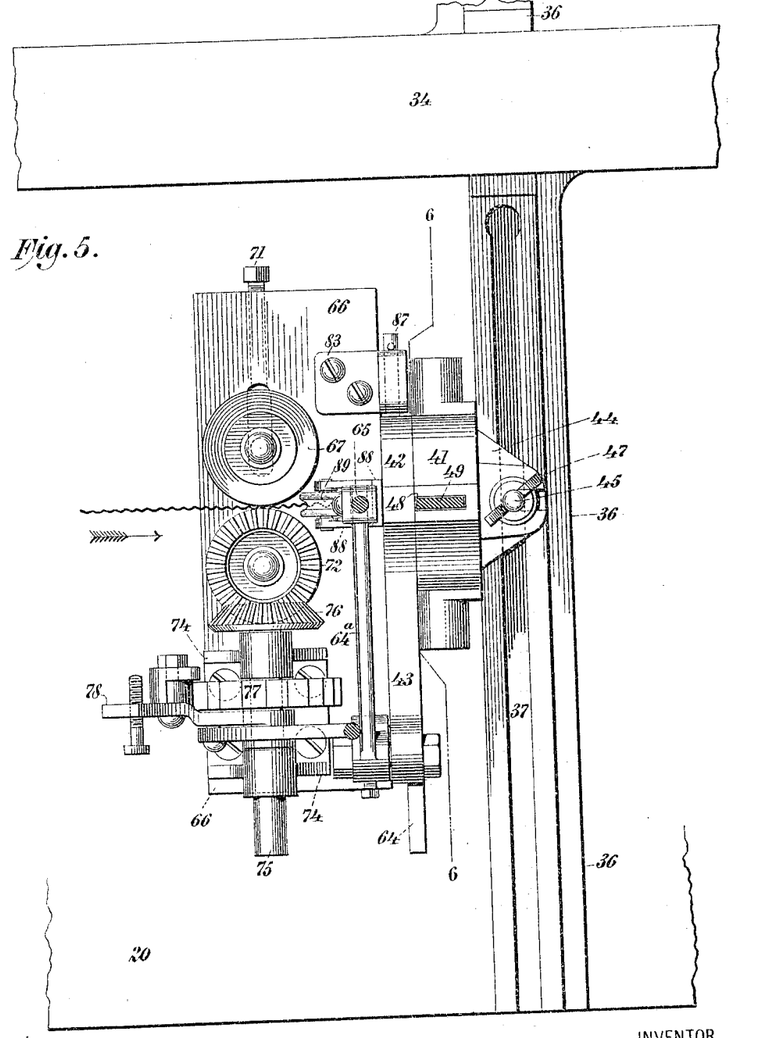
Fig. 5 is a detail horizontal section taken on the line 5—5 of Fig. 3.
Figure 6:
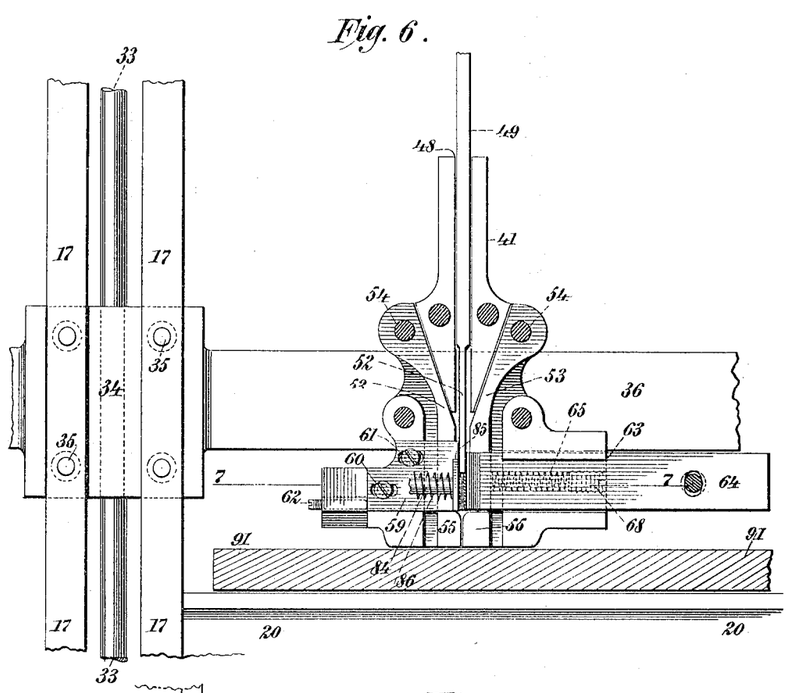
Fig. 6 is a detail vertical section taken on the line 6—6 of Fig. 5.
Figure 7:
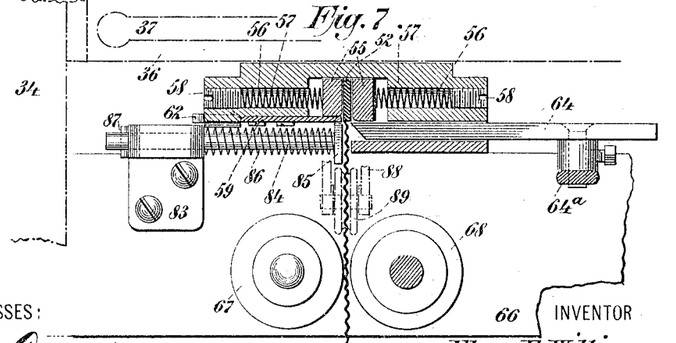
Fig. 7 is a detail horizontal section taken on the line 7—7 of Fig. 6.
Figure 8:
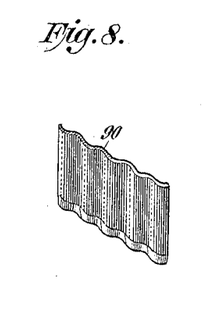
Fig. 8 is a perspective view of a fastener.
Figure 9:
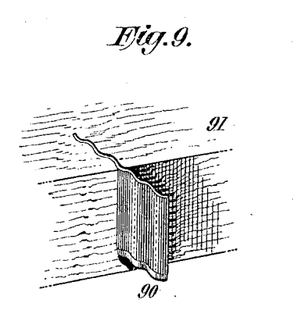
Fig. 9 is a perspective view showing one end of a fastener embedded in a strip of wood.
Figure 10:
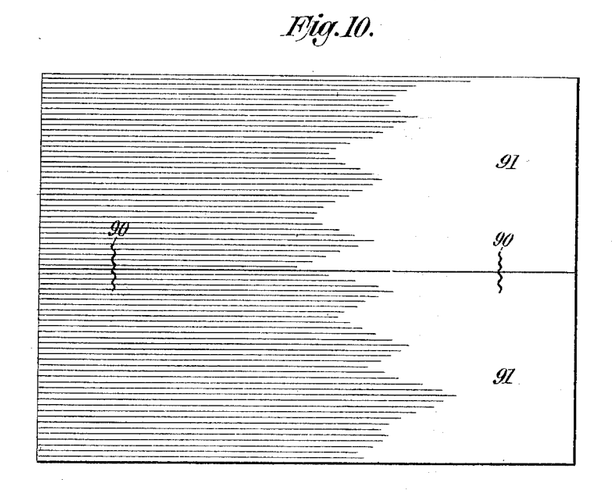
Fig. 10 is a top or face view of a box end consisting of two pieces of wood united by fasteners.

The operation of the machine is as follows: The strips of wood are placed side by side with their edges closely together upon the table 20 and arranged to be fed into the machine from its opposite sides. The machine is then set in motion by throwing the clutch 23 into engagement with its coöperating parts on the pulley 22. As soon as this has been done the shaft 21 and gear wheels 26, 26 will be caused to rotate and communicate motion to the gear wheels 27 27, actuate the rods 33, 33, and cause the cross-head 29 to ascend and assume the position shown at Fig. 1. As the cross head 29 ascends it carries upward with it the plungers 49, 49, and later in its movement first the rod 80 and then the rod 65. During the forepart of this upward movement the rod 80 lifts the arm 78 and causes the detent 29 to partially rotate the shaft 75 and bevel gear wheel 76, and communicate a rotary movement to the corrugated feed roller 68 through the bevel gear wheel 72 thereon and thereby feed forward the end of the strip 40. During the remainder of the upward movement of the cross-head 29, and after the end of the strip 40 has been fed into the chuck or casing 41, and is held in position between the jaws 53, 53 therein, the rod 65 will actuate the bell crank lever 64ª and cause the same to move the knife 64 inward, and in so doing sever the end of the strip of metal 40 held intermediate the jaws 53, 53. Hereupon, as the shaft 28 and gear wheels 27, 27 continue to rotate, the rods 33, 33 will cause the cross-head 29 to descend and force the plungers 49 49 downward into the casings 41, 41 and in descending the lower reduced ends 52, 52 thereof will be brought to bear upon the upper edges of the fastening devices 90, 90 (which have now been formed, and are held between the jaws 53, 53) downward and into the abutting edges of the boards 91, 91 to be joined. The boards are thence fed forward and with the next upward movement of the cross-head 29 the operation above described will be repeated, and continue until the clutch 23 is released, and the machine thrown out of operation.

Having thus described my invention, what I claim and desire to secure by Letters Patent, is:

1. In a machine of the character described, the combination with a table for supporting the material to be joined, of a support arranged transversely above the same, a reciprocating member arranged above said transverse support, means for actuating the same, a feeding device adjustably mounted upon said transverse support and connected to said reciprocating member and arranged to advance one end of a metal strip, means for regulating said feeding device to vary the amount of said strip advanced, a chuck adjustably mounted upon said transverse support and adjustable with said feeding device and arranged to receive the advanced end of said strip, a cutting device mounted upon said chuck and connected to said reciprocating member and arranged to sever the advanced end of said strip disposed within said chuck, spring-pressed means for holding the severed end of said strip longitudinally in a horizontal position in said chuck, and a plunger arranged to drive said severed end edgewise from said chuck into the material; said plunger having its lower end disposed within said chuck, and its upper end adjustably secured to said reciprocating member, substantially as specified.

2. In a machine of the character described, the combination with a table for supporting the material to be joined, of a support arranged transversely above the same, a reciprocating member arranged above said transverse support, means for supporting a roll of metal strip, a feeding device adjustably mounted upon said transverse support and arranged to advance one end of said strip, a link connecting said feeding device with said cross-head, a chuck on said transverse support and adjustable with said feeding device and arranged to receive the advanced end of said strip, a reciprocating knife arranged upon said chuck for severing the end of the metal strip disposed within said chuck, a link connecting said knife with said cross-head, means for holding the severed end of said strip within said chuck a plunger having its lower end disposed within said chuck, and its upper end adjustably secured to said cross-head, and means for operating said cross-head to actuate said feeding and cutting devices during its movement in one direction, and the plunger during its movement in the opposite direction, substantially as specified.

3. In a machine of the character described, the combination with a frame, of a table thereon for supporting the material to be joined, a support secured transversely to said frame above said table having laterally projecting arms, a vertically reciprocal cross-head mounted in said frame above said transverse support, and provided with laterally projecting arms registering with those on said transverse support, brackets secured to said frame having reels mounted thereon designed to hold rolls of metal strip, feeding devices adjustably mounted upon the arms of said transverse support, links having their lower ends pivotally secured to said feeding devices, and their upper ends adjustably secured to the arms of the cross-head, chucks adjustably mounted on the arms of said transverse support, reciprocating knives arranged upon said chuck, levers for actuating said knives, links having their lower ends pivotally secured to said levers, and their upper ends adjustably secured to the arms of the cross-head, plungers having their lower ends disposed within said chucks to work therein, and their upper ends adjustably secured to the arms of the cross-head, and means for reciprocating said cross-head, substantially as specified.

4. In a machine of the character described, the combination with a frame, of a table thereon for supporting the material to be joined, a transverse support secured to said frame above said table having laterally projecting arms, a vertically reciprocable cross-head mounted in said frame above said transverse support, and provided with laterally projecting arms registering with those on said transverse support, brackets secured to said frame and having reels mounted thereon and designed to hold rolls of metal strip, feeding devices adjustably mounted upon the arms of said transverse support, links having their lower ends pivotally secured to said feeding devices, and their upper ends adjustably secured to the arms of the cross-head, stops adjustably secured on said links for regulating the movement of said feeding device to vary the extent of the strip advanced, chucks adjustably mounted on the arms of said transverse support, reciprocating knives arranged upon said chuck, levers for actuating said knives, links having their lower ends pivotally secured to said levers, and their upper ends adjustably secured to the arms of the cross-head, plungers having their lower ends disposed within said chucks to work therein, and their upper ends adjustably secured to the arms of the cross-head, and means for reciprocating said cross-head, substantially as specified.

Signed at the city of New York, in the county and State of New York, this sixteenth day of March, nineteen hundred and six.

ELMER E. WILLIAMS.

Witnesses:
C. A. DIETERICH,
EARLE H. HOUGHTOLING.